United States Patent [19]

Boulos et al.

[11] Patent Number: 5,070,048
[45] Date of Patent: Dec. 3, 1991

[54] BLUE GLASS COMPOSITIONS

[75] Inventors: Edward N. Boulos, Troy; Mark F. Best, Taylor; Roman Surowiec, Redford, all of Mich.

[73] Assignee: Ford Motor Company, Dearborn, Mich.

[21] Appl. No.: 626,497

[22] Filed: Dec. 12, 1990

[51] Int. Cl.$^5$ .............................................. C03C 3/087
[52] U.S. Cl. ...................................................... 501/71
[58] Field of Search ............................................ 501/71

[56] References Cited

U.S. PATENT DOCUMENTS

| Re. 25,312 | 1/1963 | Duncan et al. | 501/71 |
| 3,296,004 | 1/1967 | Duncan | 501/71 |
| 3,498,806 | 3/1970 | Hammer et al. | 501/71 |
| 3,723,142 | 3/1973 | Kato et al. | 501/71 |
| 4,101,705 | 7/1978 | Fischer et al. | 501/71 |
| 4,866,010 | 9/1989 | Boulos et al. | 501/71 |
| 4,873,206 | 10/1989 | Jones | 501/71 |

FOREIGN PATENT DOCUMENTS

| 1141417 | 12/1962 | Fed. Rep. of Germany | 501/71 |
| 38-923 | 2/1963 | Japan | 501/71 |

Primary Examiner—Mark L. Bell
Attorney, Agent, or Firm—Charles H. Ellerbrock; Roger L. May

[57] ABSTRACT

A blue glass composition comprises conventional soda-lime-silica glass ingredients and specific amounts of $Fe_2O_3$, $Co_3O_4$, NiO, and optionally Se, resulting in an Illuminant C transmittance of 54% ±3% at one quarter inch thickness, a dominant wavelength of 482 nm±1 nm, and a color purity of 13% ±1%.

2 Claims, No Drawings

1

BLUE GLASS COMPOSITIONS

FIELD OF THE INVENTION

This invention relates generally to blue glass compositions, and more particularly, to blue glass compositions having an Illuminant C transmittance of 54%±3%, a dominant wavelength of 482 nm±1 nm, and a color purity of 13%±1%, at a glass thickness of one quarter inch.

BACKGROUND OF THE INVENTION

Glass compositions having various colors are used, for example, by architects in glazing buildings. Normally, the color selected by the architect serves several functions. A first function of the color is to make the glass aesthetically pleasing when viewed from the exterior of the building. Aesthetics will determine the acceptability of a desired particular glass color and, in part, the desired intensity of the color. A second function is to reduce the amount of heat absorbed from the exterior of the building to the interior of the building, so that the air conditioning load in the building is reduced. Generally, more color added to glass results in greater heat absorption. In addition, while color may readily be added to glass to serve these functions, that glass when colored still must have an appropriate visible light transmittance value.

Those skilled in the art of formulating glass compositions are familiar with various suitable glass colorants. Thus, a small amount of cobalt oxide is known to produce a cold blue color widely considered unattractive and undesirable for architectural and certain other uses. A high concentration of nickel is known to produce black glass. Selenium can produce pink or red, and ferrous oxide can produce green glass and contribute to advantageous solar load control properties. The glass color produced by a mixture of colorants will vary with both the amount and relative proportions used. As noted above, varying the choice and amount of colorants also affects the light transmittance value of the glass. As discussed further below, however, the effect on glass color and transmittance of mixing multiple colorants and/or varying the amount or relative proportions of the colorants is not reliably predictable.

In the following discussion, certain terms well known to those skilled of the art are used to describe color in glass. One method of specifying color is by the use of dominant wavelength and color purity. These are derived from tristimulus coefficients that have been defined by the CIE (Commission Internationale de l'Eclairage). Numerical values for a given glass color can be determined by calculating the trichromatic values X, Y, and Z. From the tristimulus values for that glass color, trichromatic coefficients x, y, and z are then calculated and plotted on a chromaticity diagram. The 1931 Standard Observer response diagram defines the amount of each of three primary colors (x is amber, y is green, and z is blue) required to produce energy of each wavelength from 3,800 Angstroms to 7,500 Angstroms, wherein the green curve is the standard luminosity curve for the human eye. The dominant wavelength and color purity is then numerically determined with respect to the coordinates of Illuminant C, an established light source.

Thus, a glass color may be specified either by its trichromatic coefficients x and y or by its dominant wavelength and purity values. The lower the color purity, the closer the color is to the Illuminant C standard and the closer it is to being a neutral color.

An understanding of the foregoing terms and definitions thereof may be had by referring to the Handbook of Colorimetry prepared by the staff of the Color Measurement Laboratory, Massachusetts Institute of Technology. This book was printed in 1936 by the Technology Press, Massachusetts Institute of Technology, Cambridge, Mass. Also, a good explanation and list of definitions is given in Color in Business, Science and Industry, (3 Ed.) John Wiley & Sons (especially pages 170-172, 377-378). Useful also is An Introduction to Color, John Wiley & Sons (especially pages 105-106).

Those skilled in the art know that adding or substituting one colorant for another and/or changing the amount or relative proportion of colorants in a glass composition affects not only the color of the glass, i.e., its dominant wavelength and its color purity, but also affects the light transmittance of the glass and its structural qualities. Furthermore, there is in many cases substantial complexity and unpredictability in these effects. Thus, for example, even if the proper alteration in the composition of a particular color glass were determined for achieving a desired color shift, the same alteration, unfortunately, would also alter (for example, unacceptably reduce) the light transmittance of the glass. It may, of course, also undesirably alter the color purity of the glass. In short, all these factors—dominant wavelength, purity, and light transmittance—are variable, and may vary unpredictably with each other. Developing a new glass composition, therefore, having a particular color and appropriate light transmittance value, is in some cases like searching for a needle in a haystack. An experimental change in the amount or relative proportion of one or more colorants in a glass composition intended to bring one of these numerical values closer to a target value causes one or both of the other values simultaneously to drift off target (or further off target).

The difficulty of this task, finding the correct glass composition for a colored glass having the desired dominant wavelength, color purity, and light transmittance, is discussed in U.S. Pat. No. 3,296,004 to Duncan, wherein a neutral brown heat absorbing glass is disclosed. Duncan expressly noted that the development of the particular color requires a careful consideration of the transmittance characteristics of the glass and that the amounts of the colorants must be carefully controlled to achieve the desired color (dominant wavelength and color purity), transmittance, and heat-absorbing characteristic. Thus, for example, Duncan pointed out that if his glass contained more cobalt oxide than he specified, the color would be more blue than desired. Considering the glass composition of the present invention for a moment, however, the great unpredictability of this area is well demonstrated by the fact that it employs cobalt oxide in an amount well within the range used by Duncan, yet achieves a blue, not a brown color. That is, the amount of cobalt oxide used by Duncan to produce brown surprisingly yields the attractive blue color in combination with the other components of the glass composition of the present invention, notwithstanding the fact that such other components are not normally associated with producing blue coloration.

This inherent unpredictability in achieving specific purity, dominant wavelength, and light transmittance values simultaneously in a glass composition had to be overcome in discovering the glass composition of the present invention. A series of blue glass compositions was fabricated for aesthetic evaluation for automotive and architectural uses, and the like. From amongst the many samples, one was chosen having a very attractive blue color—the color of the glass composition of the present invention. In particular, it was a blue having a dominant wavelength of 482 nm±1 nm and a purity of 13%±1%. These values correspond to the color coordinates of the glass, i.e., trichromatic coefficients, of about x=0.2799 and y=0.2947.

The task then was to develop a blue glass composition including appropriate colorants which yielded the same dominant wavelength and color purity, but with a desired Illuminant C transmittance value of 54%±3%. As explained above, however, altering the various colorants, the amounts, and relative proportions in which they were used, for purposes of achieving the correct light transmittance value simultaneously caused the color, that is the dominant wavelength and purity, to drift off target.

The visible light transmittance value of the blue glass of the present invention is dictated by an important commercial consideration. Specifically, glass of the same composition has to be suitable for both motor vehicle glazing and architectural glazing applications. That is, in order to achieve significant manufacturing cost savings, glass for both architectural glazing and automotive glazing applications had to be producible together on the same float glass production line. To use the same glass in both of these applications, it must have an Illuminant A transmittance at least high enough to meet applicable government standards for motor vehicle glazings, and yet low enough to provide heat load reduction to meet architectural glazing specifications. Thus, an Illuminant C transmittance value of 54%±3% was determined for the glass, at one quarter inch thickness. This meets various applicable architectural standards and, when used as one of the 0.090 inch thick glass panels (the other 0.090 inch thick glass panel being clear) in a laminated safety glass windshield, yields the desired blue of the invention with an Illuminant A visible light transmittance of at least 70% to meet current U.S. government standards for motor vehicle windshields.

Dozens of experimental glass compositions were tried without success. The numerous variables affecting color in a glass composition, e.g., selection of colorant(s), their amounts, relative amounts, etc., and the unpredictability of the type or degree of change effected by varying one or more of them led to failure after failure. The search continued and dozens of additional experimental glass compositions were tried. Those skilled in the practical aspects of this art will understand the very considerable effort and expense involved in a research and development program of this nature. Still the glass compositions which provided the necessary light transmittance together with the selected dominant wavelength and the selected purity were undiscovered. More time, money, and effort were expended to produce and test dozens of additional experimental glass compositions. All of these were also unsuccessful.

Finally a glass composition was produced and tested and found to have the needed Illuminant C transmittance of 54%±3% in conjunction with the desired blue color having a dominant wavelength equal to 482 nm±1 nm and a color purity equal to 13%±1%. Furthermore, as disclosed below, this was achieved using four colorants, each readily commercially available at reasonable cost and each used in a practical, easily measured quantity.

A blue glass having approximately the same transmittance, dominant wavelength, and excitation purity values, but containing only three colorants, is disclosed in U.S. Pat. No. 4,866,010 to Boulos et al. However, the patent does not suggest that a fourth colorant may be added, and the proportions of the original three colorants modified, to achieve virtually the same values for transmittance, dominant wavelength, and color purity as for the present inventive glass composition. Specifically, the patent does not suggest, and in fact teaches away from, the use of nickel, which typically imparts a reddish-brown color to glass, as a component of the present inventive blue glass composition.

U.S. Pat. No. 2,938,808, subsequently reissued as U.S. Pat. No. Re 25,312, discloses as a new article of manufacture a neutral color sheet of glass having a thickness in the range of $\frac{1}{8}$-$\frac{1}{4}$ inch. The glass is suitable for glazing purposes and has a substantially uniform transmittance for light in the portion of the spectrum between 440 and 660 millimicrons, a color purity below 7%, a total solar energy transmittance between 40% and 48%, and a total luminous transmittance between 35% and 45%, at a thickness of $\frac{1}{4}$ inch. The disclosed glass composition consists essentially of base ingredients in percentages by weight as follows: 60–75% $SiO_2$, 11–20% $Na_2O$, 0–10% $K_2O$, the sum of the $Na_2O$ and the $K_2O$ being 11–21%, 6–16% CaO, and 0–10% MgO, the sum of the CaO and MgO being 6–18%, together with 0.4% $Fe_2O_3$, 0.0076–0.008% $Co_3O_4$, 0.009–0.126% NiO, and 0.005–0.0056% Se. The patent teaches that the amounts of the colorants $Fe_2O_3$, $Co_3O_4$, NiO, and Se are greater when the thickness of the sheet is less than $\frac{1}{4}$ inch, and is approximately twice the above listed amounts for each colorant when the thickness of the sheet is $\frac{1}{8}$ inch.

U.S. Pat. No. 3,723,142 discloses a neutral gray colored heat absorbing glass having a low color purity. The glass is defined as consisting essentially of the following base components in percentages by weight: 68–75% $SiO_2$, 0–5% $Al_2O_3$, 5–15% CaO, 0–10% MgO, the sum of the CaO and the MgO being 6–15%, 10–18% $Na_2O$, and 0–5% $K_2O$, the sum of the $Na_2O$ and the $K_2O$ being 10–20%, together with coloring components of 0.1–0.5% $Fe_2O_3$, 0.003–0.02% $Co_3O_4$, 0.0005–0.001% Se, and negligible NiO. The patent states that the quantity of NiO should be less than about 0.002% and preferably less than 0.0004%.

U.S. Pat. No. 3,498,806 discloses various specific compositions for glasses of "generally blue" coloration, along with compositions for clear glass and glasses of green or other coloring. None of these compositions, however, is the same or even similar to the composition of the glass of the present invention. They differ most notably in both the selection of colorants (using certain colorants not used in the present invention and others which are used) and the amounts and relative proportions of the colorants. Specifically, the patent does not disclose the use of nickel in the glass composition.

Finally, U.S. Pat. No. 4,101,705 discloses neutral bronze glazings having a dominant wavelength in the range of 570 nm to 580 nm and a color purity from 2% to 6%. the weight percentages of $Co_3O_4$ and NiO are lower, and the weight percentage of Se is higher, than the allowable ranges for these colorants in the present invention.

It must be noted that the prior art referred to hereinabove has been collected and examined only in light of the present invention as a guide. It is not to be inferred that such diverse art would otherwise be assembled absent the motivation provided by the present invention, nor that the cited prior art when considered in combination suggests the present invention absent the teachings herein.

SUMMARY OF THE INVENTION

Accordant with the present invention, a blue glass composition having an Illuminant C transmittance of 54%±3% at a glass thickness of one quarter inch, a dominant wavelength of 482 nm±1 nm, and a color purity of 13%±1%, has surprisingly been discovered. The glass consists essentially of 68% to 75% by weight $SiO_2$; up to 5% by weight $Al_2O_3$; 5% to 15% by weight CaO; up to 10% by weight MgO, wherein CaO+MgO is 6% to 15% by weight; 10% to 18% by weight $Na_2O$; up to 5% by weight $K_2O$, wherein $Na_2O+K_2O$ is 10% to 20% by weight; 0.189% to 0.478% by weight $Fe_2O_3$; 0.0048% to 0.0080% by weight $Co_3O_4$; and additional colorant selected from the group consisting of: a mixture of 0.00005% to 0.0153% by weight NiO and 0.00005% to 0.0003% by weight Se; and 0.0048% to 0.0153% by weight NiO.

The present invention also includes a method for coloring a basic soda-lime-silica glass batch to produce precise color and transmittance properties by admixing into the batch specific quantities of $Fe_2O$, $Co_3O_4$, NiO, and optionally Se.

The glass compositions of the present invention are particularly suited for the manufacture of blue-colored automotive and architectural glazings.

DETAILED DESCRIPTION OF THE PREFERRED EMBODIMENT

The glass of the Present invention generally comprises a basic soda-lime-silica glass composition having specific colorants in specific quantities therein.

The basic soda-lime-silica glass comprises 68% to 75% by weight $SiO_2$, up to 5% by weight $Al_2O$, 5% to 15% by weight CaO, up to 10% by weight MgO, with the proviso that CaO+MgO is 6% to 15% by weight of the glass, 10% to 18% by weight $Na_2O$, and up to 5% by weight $K_2O$, with the proviso that $Na_2O+K_2O$ is 10% to 20% by weight of the glass. Silica forms the glass matrix. Alumina regulates the viscosity of the glass, and prevents devitrification. Calcium oxide, magnesium oxide, sodium oxide, and potassium oxide act as fluxes to reduce the melting temperature of the glass. Furthermore, the alumina, calcium oxide, and magnesium oxide act together to improve the durability of the glass.

Colorants are admixed into the molten batch of basic soda-lime-silica glass (which is otherwise clear), according to the present invention, to impart a blue color and achieve specific transmittance and chromatic characteristics. By "admixing into the molten batch" is also contemplated the addition of the colorants along with the basic glass batch ingredients simultaneously into the melting tank. Ferric oxide ($Fe_2O_3$) is present in an amount from 0.189% to 0.478% by weight of the glass. Additionally, cobalto-cobaltic oxide ($Co_3O_4$) is present in an amount from 0.0048% to 0.0080% by weight of the glass. Finally, nickel oxide (NiO) is present, either alone or in combination with selenium (Se), as follows: 0.0048% to 0.0153% by weight NiO; or a mixture of 0.00005% to 0.0153% by weight NiO and 0.00005% to 0.0003% by weight Se.

Glass compositions according to the present invention are blue in reflection and transmission and have an Illuminant C transmittance of 54%±3% at a glass thickness of one quarter inch, a dominant wavelength of 482 nm±1 nm, and a color purity of 13%±1%. The tristimulus coefficients are approximately x=0.2799 and y=0.2947.

EXAMPLES 1 AND 2

Various quantities of sand, soda ash, dolomite, limestone, salt cake, sodium nitrate, rouge, cobalto-cobaltic oxide, and selenium metal and/or nickel oxide are combined as set forth in Table I.

TABLE I

| Glass Batch Ingredients (Grams) | | |
|---|---|---|
| Ingredient | Example 1 | Example 2 |
| Sand | 1000.0 | 1000.0 |
| Soda Ash | 311.1 | 311.3 |
| Dolomite | 260.8 | 261.2 |
| Limestone | 70.4 | 70.1 |
| Salt Cake | 10.9 | 11.0 |
| Sodium Nitrate | 10.4 | 10.4 |
| Rouge | 3.430 | 5.301 |
| $Co_3O_4$ | 0.1107 | 0.1118 |
| NiO | 0.1345 | 0.0660 |
| Selenium Metal | 0.0 | 0.0147 |

The aforementioned glass batch ingredients are melted together to form glass compositions as set forth in Table II.

TABLE II

| Glass Compositions (wt %) | | |
|---|---|---|
| Component | Example 1 | Example 2 |
| $SiO_2$ | 73.93 | 72.62 |
| $Na_2O$ | 12.63 | 13.70 |
| CaO | 8.56 | 8.67 |
| MgO | 4.10 | 4.09 |
| $Al_2O_3$ | 0.12 | 0.11 |
| $SO_3$ | 0.28 | 0.30 |
| $TiO_2$ | 0.01 | 0.01 |
| $K_2O$ | 0.06 | 0.04 |
| $Fe_2O_3$ | 0.290 | 0.430 |
| $Co_3O_4$ | 0.0055 | 0.0054 |
| NiO | 0.0072 | 0.0035 |
| Se Metal | 0.0 | 0.00015 |

The properties of the resultant glass compositions, at a thickness of ¼ inch, are set forth in Table III.

TABLE III

| Optical Properties (at ¼ inch) | | |
|---|---|---|
| | Example 1 | Example 2 |
| Illuminant C Transmittance | 53.4% | 51.4% |
| Dominant Wavelength | 481.4 nm | 481.5 nm |
| Color Purity | 13.9% | 13.9% |

These examples may be repeated with similar success by substituting the generically or specifically described reactants and/or reactant conditions recited herein for those actually used in the preceding example.

From the foregoing description, one ordinarily skilled in the art can easily ascertain the essential characteristics of this invention, and without departing from its spirit and scope, can make various changes and modifications in the invention to adapt it to various usages and conditions.

We claim:

1. A blue-colored glass having an Illuminant C transmittance of 54%±3% at a glass thickness of one quarter inch, a dominant wavelength of 482 nm±1 nm, and a color purity of 13%±1%, consisting essentially of:
   A. 68% to 75% by weight $SiO_2$;
   B. up to 5% by weight $Al_2O_3$;
   C. 5% to 15% by weight CaO;
   D. up to 10% by weight MgO, wherein CaO+MgO is 6% to 15% by weight;
   E. 10% to 18% by weight $Na_2O$;
   F. up to 5% by weight $K_2O$, wherein $Na_2O+K_2O$ is 10% to 20% by weight; and
   G. colorant selected from the group consisting of:
      i. 0.290% by weight $Fe_2O_3$, 0.0055% by weight $Co_3O_4$, and 0.0072% by weight NiO; and
      ii. 0.430% by weight $Fe_2O_3$, 0.0054% by weight $Co_3O_4$, 0.0035% by weight NiO, and 0.00015% by weight selenium.

2. A glazing for automotive or architectural use prepared from the blue-colored glass of claim 1.

* * * * *